United States Patent
Kamboj et al.

(10) Patent No.: US 10,824,474 B1
(45) Date of Patent: Nov. 3, 2020

(54) DYNAMICALLY ALLOCATING RESOURCES FOR INTERDEPENDENT PORTIONS OF DISTRIBUTED DATA PROCESSING PROGRAMS

(71) Applicant: Amazon Technologies, Inc., Seattle, WA (US)

(72) Inventors: Ankit Kamboj, Seattle, WA (US); Vinayak Thapliyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 15/812,923

(22) Filed: Nov. 14, 2017

(51) Int. Cl.
*G06F 9/50* (2006.01)

(52) U.S. Cl.
CPC .......... *G06F 9/5072* (2013.01); *G06F 9/5038* (2013.01); *G06F 9/5077* (2013.01); *G06F 2209/5011* (2013.01)

(58) Field of Classification Search
CPC .... G06F 9/5072; G06F 9/5077; G06F 9/5038; G06F 2209/5011
See application file for complete search history.

(56) References Cited

U.S. PATENT DOCUMENTS

| | | | |
|---|---|---|---|
| 7,953,891 B2 | 5/2011 | Blaszczak et al. | |
| 8,024,369 B2 | 9/2011 | Pellegrini et al. | |
| 8,380,657 B2 | 2/2013 | Shaik et al. | |
| 8,918,511 B2 * | 12/2014 | Gulley | G06F 9/5027 709/224 |
| 2004/0255296 A1 * | 12/2004 | Schmidt | G06F 9/4887 718/100 |
| 2009/0177671 A1 | 7/2009 | Pellegrini et al. | |
| 2009/0192979 A1 | 7/2009 | Lunde | |
| 2010/0274750 A1 | 10/2010 | Oltean et al. | |
| 2015/0100542 A1 | 4/2015 | Li et al. | |
| 2015/0106498 A1 * | 4/2015 | Gulley | G06F 9/5027 709/223 |
| 2015/0113009 A1 | 4/2015 | Zhou et al. | |
| 2015/0286701 A1 | 10/2015 | Wideman | |
| 2015/0347541 A1 | 12/2015 | Holmes et al. | |

OTHER PUBLICATIONS

International Search Report and Written Opinion from PCT/US2017/063271, dated Jan. 25, 2018, Amazon Technologies, Inc., pp. 1-17.

(Continued)

*Primary Examiner* — Kristie D Shingles
(74) *Attorney, Agent, or Firm* — Robert C. Kowert; Kowert, Hood, Munyon, Rankin & Goetzel, P.C.

(57) ABSTRACT

Portions of distributed data processing programs may be dynamically allocated computing resources. When execution of a distributed data processing program is requested, interdependent portions of the resource may be dynamically computing resources according to requirements determined for the portions. A resource manager may, in some embodiments, respond to individual allocation requests for the different portions received from a program manager for the distributed data processing program. The allocated resources may be obtained from pools of computing resources that can be utilized by different distributed data processing programs.

20 Claims, 8 Drawing Sheets

(56) References Cited

OTHER PUBLICATIONS

Bratko, A. et al., "Exploiting Structural Information for semi-structured document categorization", Information Processing & Management, Dated May 1, 2006, vol. 42, No. 3, pp. 679-694.
Juan Trujillo et al., "A UML Based Approach for Modeling ETL Processes in data warehouses", In: Network and parallel computing, dated Oct. 16, 2003, pp. 1-14.
Anonymous, "Start informatica job when a row is updated", retrieved from URL: https://network.informatica.com/thread/13920. on Jan. 10, 2018. pp. 1-5.
Anonymous, "File based job trigger for deploying talend open studio jobs-Talend Community forum", Retrieved from URL: https://www.talendforge.org/forum/viewtopic.php?id=45580, retrieved on Jan. 10, 2018, pp. 1-3.
Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2016, pp. 1-17.
U.S. Appl. No. 15/385,764, filed Dec. 20, 2016, Mehul A. Shah et al.
U.S. Appl. No. 15/385,772, filed Dec. 20, 2016, Mehul A. Shah et al.
U.S. Appl. No. 15/385,784, filed Dec. 20, 2016, George Steven McPherson et al.
U.S. Appl. No. 15/385,789, filed Dec. 20, 2016, George Steven McPherson et al.
U.S. Appl. No. 15/385,777, filed Dec. 20, 2016, Mehul A. Shah et al.
U.S. Appl. No. 15/385,787, filed Dec. 20, 2016, George Steven McPherson.

\* cited by examiner

DYNAMICALLY ALLOCATING RESOURCES FOR INTERDEPENDENT PORTIONS OF DISTRIBUTED DATA PROCESSING PROGRAMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may execute programs on behalf of customers. Thus techniques for leveraging the power of distributed systems to perform operations on behalf users without burdening the users with provisioning, administrating, and managing tasks are desirable.

Figure 1:
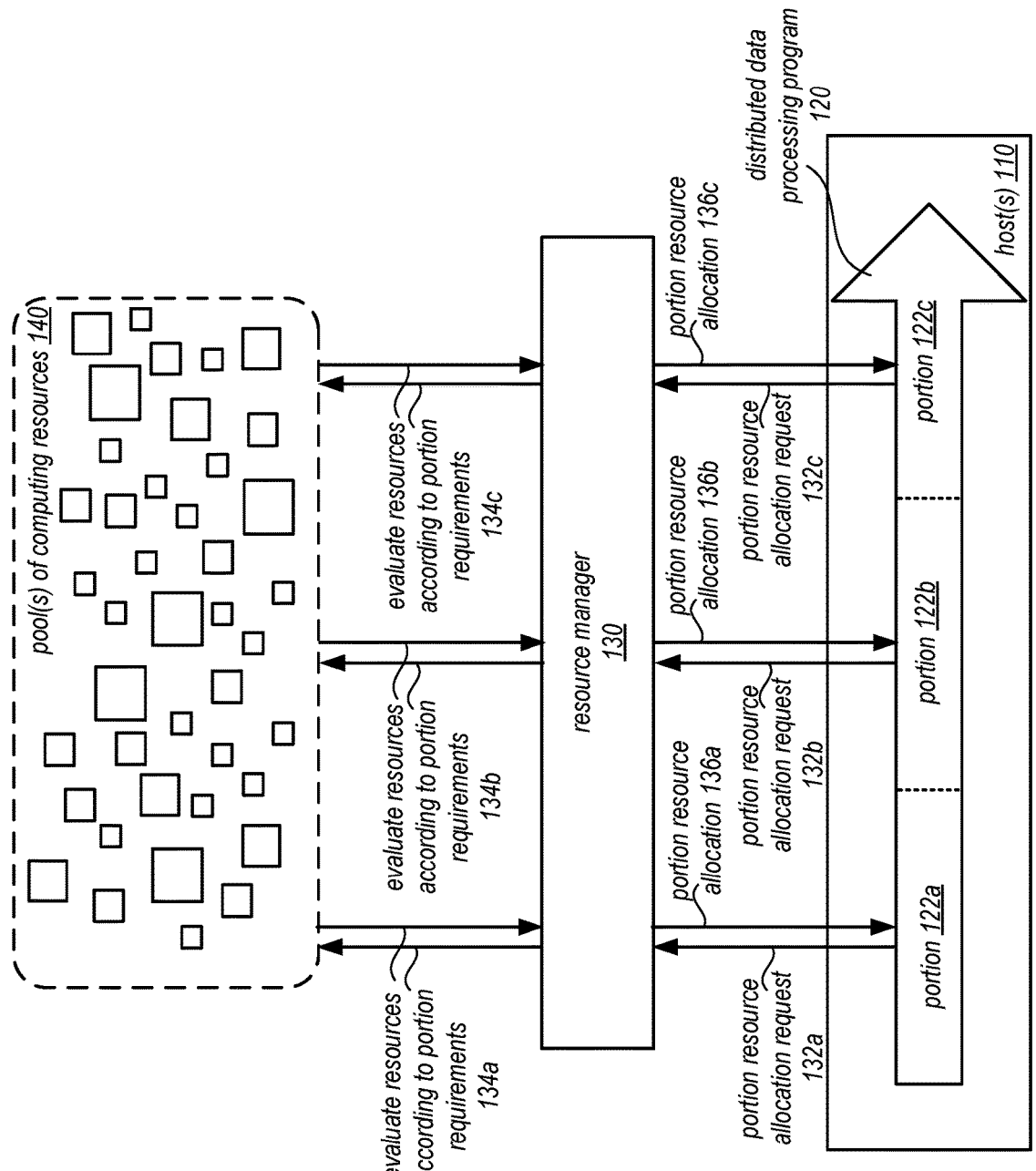
FIG. 1 illustrates a logical block diagram of dynamically allocating resources for interdependent portions of distributed data processing programs, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of dynamically allocating resources for interdependent portions of distributed data processing programs are described herein. Distributed data processing programs are implemented to perform a variety of tasks or operations to generate, create, evaluate, transform, move, remove, combine, reformat, or otherwise interact with data, often stored in distributed fashion, in some embodiments. Because distributed applications may utilize multiple resources to perform the tasks or operations, distributed data processing programs can operate on large amounts of data with faster performance, in some embodiments. Large numbers of computing resources, such as various servers, nodes, hosts, or other hardware and/or software resources may be allocated to distributed data processing programs in order to complete the tasks or operations, in some embodiments.

A manager, coordinator, leader, master, or other computing resource for directing execution of a distributed data processing program may plan and/or instruct other computing resources that perform work as part of the distributed data processing program, in some embodiments. In order to utilize the computing resources to perform the work, the manager resource may receive allocations of available computing resources to perform the work from a resource manager, which may allocate computing resources to a distributed data processing program, in some embodiments. The resource manager may dynamically allocate resources to interdependent portions of the distributed data processing application in order to optimally allocate computing resources for the different portions, which may optimally use different combinations or types of computing resources to perform work for that portion of the distributed data processing program, in some embodiments. In this way, work for the distributed data processing application may avoid the use of static resource assignments to a particular cluster of computing resources, for instance. Instead, the number and/or type of computing resources may grow or shrink according to the requirements of the portion (and availability of computing resources), in some embodiments.

FIG. 1 illustrates a logical block diagram of dynamically allocating resources for interdependent portions of distributed data processing programs, according to some embodiments. Pool(s) of computing resources 140 may include various different kinds of computing resources to perform work as part of a distributed data processing program, such as distributed data processing program 120. For example, computing resources may be individual servers, nodes, processors (or processor cores), or other hardware resources that may be allocated in part (e.g., a single processor core) or in whole to perform work for distributed data processing program 120. In some embodiments, as discussed below with regard to FIG. 5, the computing resources may be virtualized resources (e.g., virtual machines or operating system virtualization). In at least some embodiments, the computing resources may be pre-loaded or otherwise pre-configured to perform work for different types of distributed data processing applications. For example, computing resources may be preconfigured to perform as executors in distributed processing program utilizing Apache Spark and/or as worker nodes to perform the work of Presto. In this way, setup time for performing distributed data processing programs can be significantly reduced, in some embodiments. For example, the manager resource can be setup by itself and begin execution of the distributed data processing program without waiting on setup for resources to perform work. Computing resources of pool(s) of computing resources may be dedicated to performing work for a single type of distributed data processing program or platform, or may be preconfigured to perform work for multiple different types of data processing platforms. Please note that the pools of distributed data processing programs given above. Various other distributed data processing platforms, applications or other programs may utilize resources from pool(s) of computing resources 140.

Resource manager 130 may manage the allocation and deallocation of resources from pool(s) of computing resources 140 for distributed data processing program 120. For example, resource manager 130 may determine allocations or assignments of computing resources, collect performance metrics to determine the state of allocated resources, including determining when allocated resources have completed the work for which the resources were allocated, direct cleanup or other operations to ready the computing resources for performing work for other distributed data processing programs (e.g., clearing, deleting, flushing, or making previous data in storage or memory unavailable to future users of the resource), and provide a common interface that a manager resource of a distributed data processing program can use to obtain resource allocations. In at least some embodiments, resource manager 130 may be implemented as part of a service, such as program execution service 230 or as separate service offered by a provider network. Access to resource manager 130 may be implemented according to a programmatic interface (e.g., utilizing one or more Application Programming Interfaces (APIs)), in some embodiments. Because different types of distributed data processing programs may be supported by resources in resource pools, resource manager 130 may serve as a common manager across multiple types of distributed data processing programs. In this way, new distributed data processing programs can be easily added or managed by resource manager 130, providing new types of distributed data processing programs with access to resources in the pool without utilizing custom interfaces (or custom resource management systems).

Dynamic allocation of resources to perform different portions may be provided by resource manager 130. For example, one or more hosts 110 implementing distributed data processing program 120 may send requests (e.g., via a network) to allocate resources 132 to perform a portion 122 of work for distributed data processing program 120 to resource manager 130. Portion resource allocation requests 132 may specify performance characteristics or other requirements, which resource manager 130 may analyze, evaluate, or otherwise compare with the computing resources of pool(s) 140 to make an allocation that satisfies (or comes closest to satisfying) the requirements for the portion. If, for instance, the portion of work is to read or obtain data from a distributed data set, a large number of computing resources may be desirable to scale the task to obtain the data quickly, whereas if the task were compute intensive (e.g., performing various statistical calculations over a smaller set of data) then a small number of computing resources (with large processing capacity, such as resources with large numbers of central processing units or graphical processing units). In some embodiments, portion resource allocation requests 132 may request or indicate to resource manager 130 to make dynamic resource allocations without direction from distributed data processing program 120 (e.g., without a specific set of requirements). Instead, resource manager 130 may determine requirements for the portion (or for different portions of the entire distributed data processing program) and making resource allocations accordingly.

Dynamic allocation may independently allocate resources for each portion of distributed data processing program 120, in some embodiments. For example, the number, type, capabilities, and/or configuration of computing resources allocated to portion 122a may be different than portion 122b, and the same or different than those allocated to portion 122c. Some resources may be utilized for multiple portions, effectively providing a cluster of computing resources with dynamic membership, expanding or contracting to meet the requirements of each portion. In some embodiments, dynamic resource allocations may effectively act as a pipeline of distributing different portions to entirely different groups of computing resources from pool(s) 140 in order to perform the work of the portion.

Distributed data processing program 120 may programmatically access resource manager 130. For example, instead of submitting resource allocation requests to a cluster manager or other local application, network requests formatted according to respective APIs may be generated and sent at different times in order to obtain the resource allocation for a portion of distributed data processing program 120, such as by sending portion resource allocation request 132a for an initial portion of work, then separately submitting later requests 132b and 132c. In this way, distributed data processing program 120 may dynamically determine the desired performance characteristics or other requirements to submit in requests 132.

In response to portion resource allocation requests 132, resource manager 130 may determine the performance characteristics or other requirements for the portion 122 of distributed data processing program 120 (e.g., according to specified requirements in the request 132 and/or according to evaluations performed at resource manager 130). Resource manager 130 may evaluate 134 available resources from pool(s) according to the portion requirements in order to make allocations for the portions 122. Because allocations are performed for individual portions of distributed data processing program 120, the respective evaluations can take advantage of changes in resource availability to improve or further optimize the performance of a later portion using resources that were not available earlier. For instance, the evaluation of resources 134a for portion 122a may result in different allocations than the allocations at evaluations 134b and/or 134c, even if the requirements were similar due to the changing availability of resources in the pool (which may be assigned to other distributed data processing programs).

Please note that the previous description of dynamically allocating resources for interdependent portions of distributed data processing programs is a logical illustration and thus is not to be construed as limiting as to the number, arrangement, configuration, or implementation of a distributed data processing program, resource manager, or pools of computing resources.

This specification begins with a general description of a provider network that implements a program execution service that executes a distributed data processing program by dynamically allocating resources for interdependent portions of distributed data processing programs. Then various examples of the program execution service, including different components/modules, or arrangements of components/module that may be employed as part of implementing the program execution service are discussed. A number of different methods and techniques to implement dynamically allocating resources for interdependent portions of distributed data processing programs are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
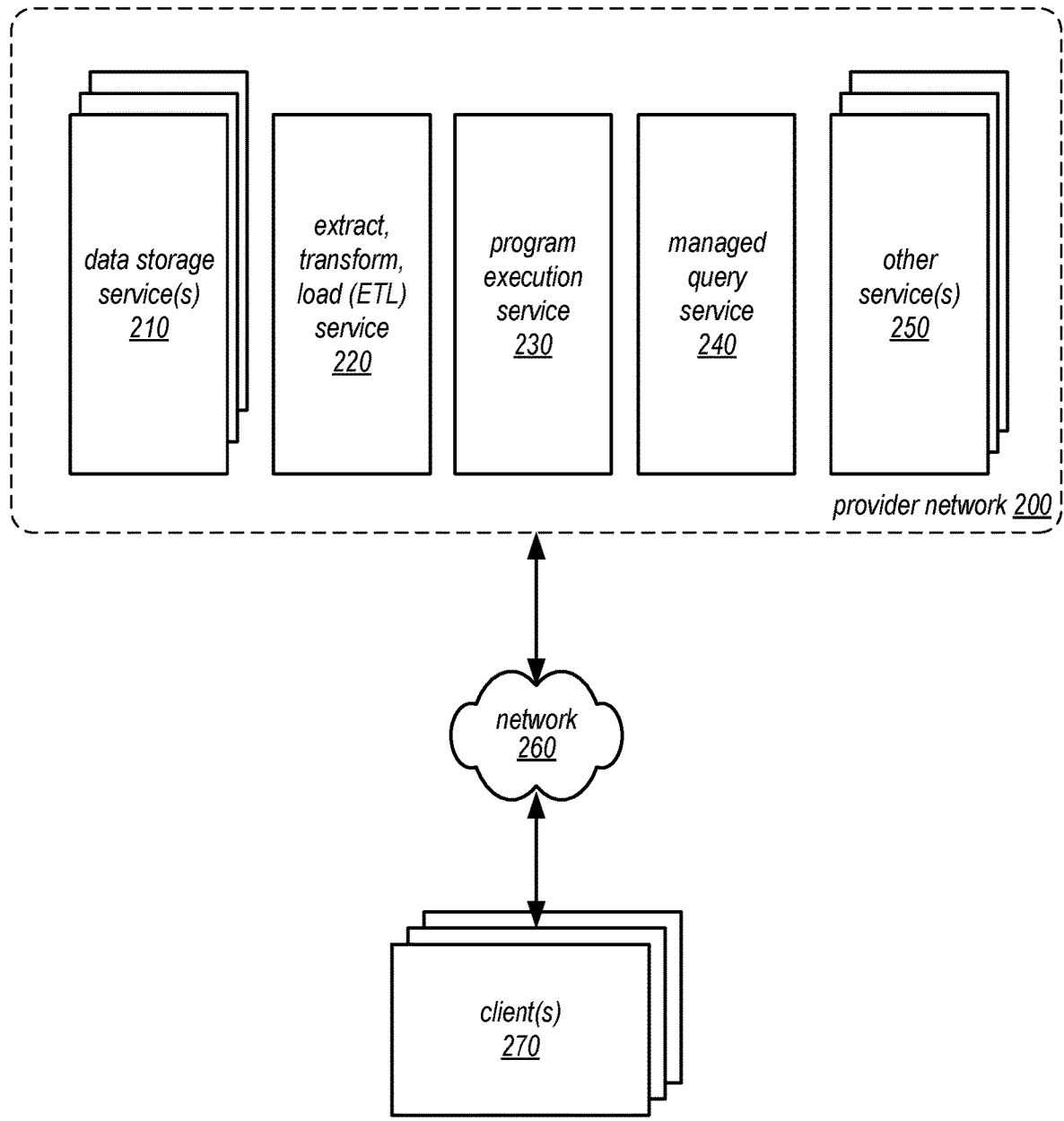
FIG. 2 is a block diagram illustrating a provider network offering different services including a program execution service, according to some embodiments.

FIG. 2 is a block diagram illustrating a provider network offering different services including a program execution service, according to some embodiments. Provider network 200 may be a private or closed system or may be set up by an entity such as a company or a public sector organization to provide one or more services (such as various types of cloud-based storage) accessible via the Internet and/or other networks to clients 270. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, program execution service 230, managed query service 240, as well as other service(s) 250, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of data storage service 210) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 270 as a network-based service that enables clients 270 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Figure 3A:
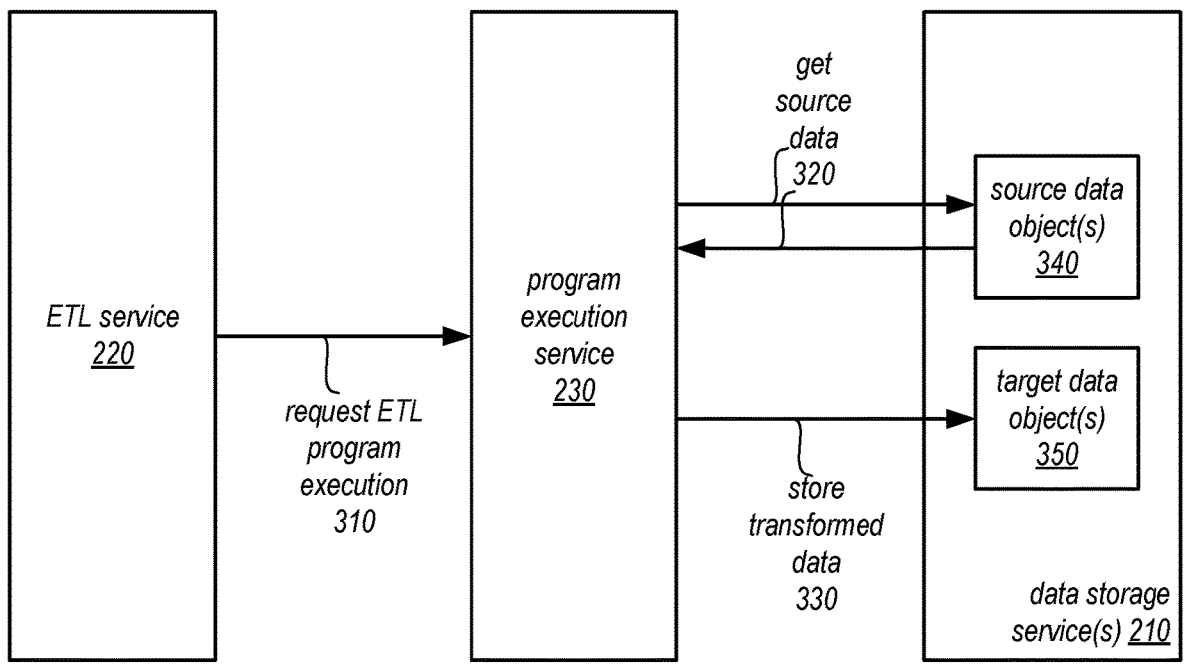
FIG. 3A is a block diagram illustrating an ETL service that performs ETL processing by submitting ETL programs to a program execution service for execution, according to some embodiments.

In some embodiments, ETL service 220 may create and dynamically update a catalog of data stored on behalf of clients in provider network 200 across the various data storage services 210, as discussed in detail below with regard to FIG. 3A. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 to another location. For example, the ETL service may provide clients with the resources to create, maintain, and orchestrate data loading jobs that take one or more data sets, perform various transformation operations, and store the transformed data for further processing (e.g., by one or more of data processing service(s)). The ETL service 220 may access a data catalog generated by ETL service 220 in order to perform an ETL operation (e.g., a job to convert a data object from one file type into one or more other data objects of a different file type).

Program execution service 230 executes distributed data processing programs on behalf of clients. Code, executables, files, configurations, and other information may be submitted to program execution service 230 via a network at a network endpoint that is not assigned or directed to any particular computing resource for performing a distributed data processing program. The execution of the distributed data processing program may be treated as a unit of work by program execution service 230, a task that is performed until completion (e.g., may be treated as an idempotent operation) and may not subject time limits or other execution restrictions (unless execution of the code is determined to have or quit unexpectedly). Program execution service 230 may determine performance characteristics or other requirements for the distributed data processing program and may identify, procure, and direct execution of the distributed data processing program at dynamically allocated resources for different portions computing resources. In at least some embodiments, program execution service 230 may implement a resource manager such as resource manager 402 in FIGS. 4 and 5. In some embodiments, resource management that provides dynamically allocated resources for interdependent portions may be implemented as a separate service (not illustrated) of provider network 200.

Managed query service 240 may manage the execution of queries on behalf of clients so that clients may perform queries over data stored in one or multiple locations (e.g., in different data storage services, such as an object store and a database service) without configuring the resources to execute the queries, in various embodiments.

Other service(s) 250 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210.

Generally speaking, clients 270 may encompass any type of client that may submit network-based requests to provider network 200 via network 260, including requests for storage services (e.g., a request to create, read, write, obtain, or modify data in data storage service(s) 210, a request to generate an ETL job at ETL service 220, a request to execute code at program execution service 230, etc.). For example, a given client 270 may include a suitable version of a web browser, or may include a plug-in module or other type of code module may execute as an extension to or within an execution environment provided by a web browser. Alternatively, a client 270 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that may interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 270 and the operating system or file system on behalf of applications executing within the operating system environment.

Clients 270 may convey network-based services requests (e.g., access requests directed to data in data storage service(s) 210, operations, tasks, or jobs, being performed as part of program execution service 230, or other service(s) 250, send queries to managed query service 240, or to interact with ETL service 220) to and receive responses from provider network 200 via network 260. In various embodiments, network 260 may encompass any suitable combination of networking hardware and protocols necessary to establish network-based-based communications between clients 270 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Different kinds of clients may utilize a program execution service. From individual clients to large distributed services, program execution service 230 may provide a scalable execution platform that tailors execution of distributed data processing programs according to the needs of the client. For example, FIG. 3A is a block diagram illustrating an ETL service that performs ETL processing by submitting ETL programs to program execution service 230 for execution, according to some embodiments. ETL Service 220 may implement create, manage and execute ETL jobs as well as a metadata store describing data objects stored in provider network 200, which may be called a data catalog.

ETL service 220 may maintain data catalogs that describe data objects (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) (e.g., requests to combine, delete, or split tables of metadata in the catalog or edit the metadata determined for a data catalog. ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement durability requirements) to ensure the availability of data catalogs for clients.

Storage for data catalog(s) may be implemented by one or more storage nodes, services, or computing devices (e.g., system 1000 discussed below with regard to FIG. 8) to provide persistent storage for data catalogs as part of ETL service 220. Such storage nodes (or other storage components of data catalog storage) may implement various query processing engines or other request handling components to provide access to data catalogs according to requests received via an interface for ETL service 220. For example, data catalog storage may be implemented as a non-relational database, in one embodiment, that stores file types and other metadata for data objects in table. In some embodiments, collections of metadata for various data objects stored across different storage service(s) 210 on behalf a single user account may be stored together in a single catalog of metadata that may be made accessible to clients.

ETL service 220 may provide clients with the ability to create ETL jobs through manual job creation (e.g., creating, edit, or uploading ETL code or creating or editing graphs of ETL jobs) or through automated job creation. ETL service 220 may handle requests for automated ETL job creation and manual ETL job creation. For example, ETL service 220 may receive job generation request which may specify the data object and target data format for an ETL job. Other job information, such as access credentials, triggering events, or any other information to execute an ETL job may be included as part of the creation request or as part of a trigger event registration request. ETL service 220 may automatically generate ETL code to perform an ETL job by determining the source data format of the data object and the target data format of the data object. For example, in one embodiment, the source and target data formats from a data catalog. In another embodiment, data format identification may perform data format recognition techniques, or access other data stores (e.g., such as a data catalog stored in relational database) to retrieve the data format information. ETL service 220 may then compare the source data format and target data format or schema to select transformations to apply to the source data object to achieve the target data format. ETL service 220 may then generate code for selected transformations and construct the source code for executing the selected transformations. The code for the ETL job may be stored in a job store for subsequent execution.

ETL service 220 may provide clients with the ability to manage, edit, delete, or otherwise change ETL jobs. Trigger events, may also be defined for ETL jobs. For example, trigger events may defined based on events, changes, modifications, or other occurrences with respect to source data objects, such as the creation of a new data object in a data store. Trigger events may also be defined based on the performance of ETL jobs, such as a success or failure event (which may be reported by program execution service 230). In this way, ETL jobs (or portions of ETL jobs) can handle both success and failure scenarios during execution without having to abort the entire ETL job. ETL service 220 may monitor for trigger events and request execution of ETL jobs. For example, ETL service 220 may utilize program execution service 230 to execute ETL jobs. ETL service 220 may send a request 310 to program execution service 230 to execute ETL an ETL program for an ETL job (e.g., the ETL code may be code for a portion or the entire ETL job).

An ETL program may be a distributed data processing application, as discussed above with regard to FIG. 1. Therefore, program execution service 230 may dynamically allocate resources for interdependent portions of the ETL program according to determined requirements, For example, the ETL program may include a particular data processing engine, like Spark or MapReduce. Program execution service 230 may determine the necessary network connections to obtain source data object(s) 340 form data storage service(s) 210 as well as the network connection to create or access target data object(s) 350. For example, program execution service 230 may determine that a Java Database Connectivity (JDBC) connection is required to access source data object(s) 340 or may determine that source data object(s) 340 are stored within a virtual private network.

Different portions of the ETL program may have different requirements. For instance, extract portion(s) of the ETL program may utilize a large number of resources (with smaller respective processing capacity). The determined requirements may identify a number of worker nodes, for instance, to get data from source data object(s) 340 according to desired throughput, rate, or total time to perform (e.g., 4 worker nodes per data volume). For a transformation portion of the same ETL program, a smaller number of worker nodes may be allocated to perform transformations (e.g., converting the data into different formats, compressing, encrypting, or otherwise combining data, filtering data, or performing various other transformations). Program execution service 230 may implement a resource manager, as discussed below with regard to FIGS. 4 and 5, to perform the dynamic allocations for the different portions of the ETL program.

As dynamic allocations of resources are performed, program execution service 230 may utilize the allocated computing resource(s), such as software containers, virtual compute instances, or servers to execute the portions of the ETL program. In some embodiments, program execution service 230 may procure or otherwise configure computing resource (s) if no preconfigured computing resources from a pool of computing resources satisfy the requirements, in some embodiments. The allocated computing resource(s) may be directed to perform the portions of the ETL program, such as portions to get source data 320 from source data object(s)

340, apply one or more transformations executed by the ETL program, and store transformed data 330 in target data object(s) 350.

Figure 3B:
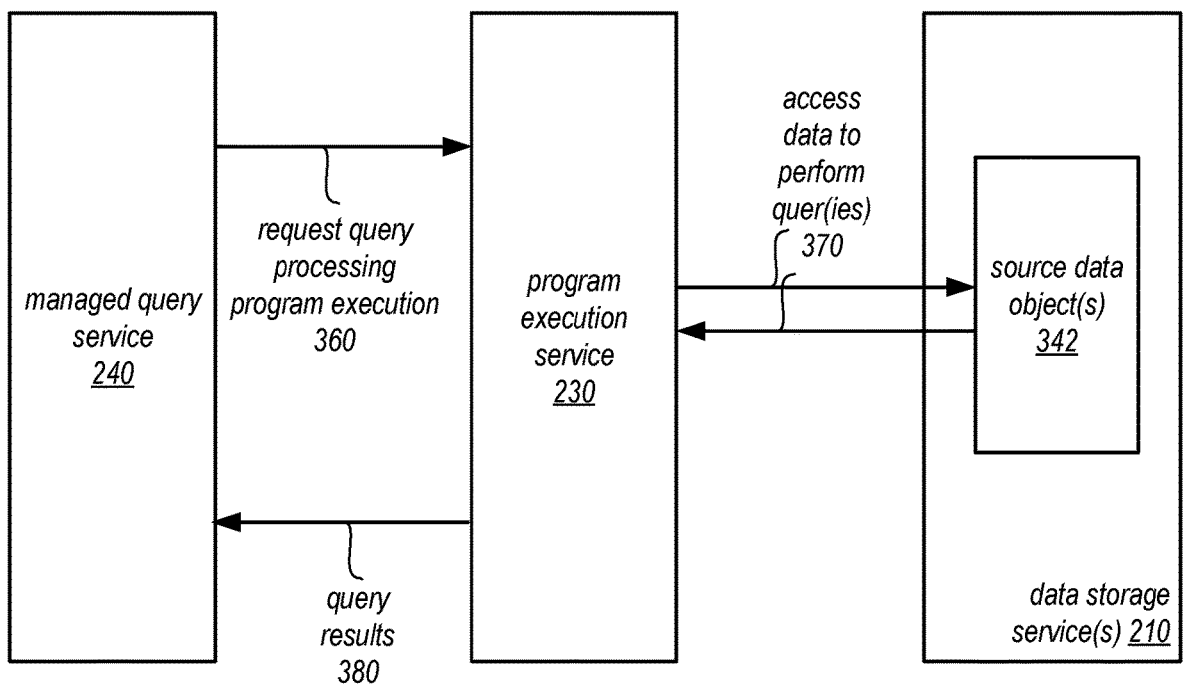
FIG. 3B is a block diagram illustrating a managed query service that performs queries on behalf of clients by submitting query processing programs to a program execution service for execution, according to some embodiments.

FIG. 3B is a block diagram illustrating a managed query service that performs queries on behalf of clients by submitting query processing programs to a program execution service for execution, according to some embodiments. Managed query service 240 may utilize program execution service 230 to execute queries, provide resources of preconfigured queries, and return utilized resources to availability. For example, a request for query processing program execution 360 may be sent from managed query service 240 to program execution service 230 indicating a query processing engine (e.g., Presto, Spark, etc.) and SQL statements or other code to perform using the query processing engine. Similar to the discussion above with regard to FIG. 3A, program execution service 230 may launch the query processing engine and cause performance of the code to perform a query using resources that are dynamically allocated to different interdependent portions of the query processing program (e.g., scanning data, aggregating data, joining data, etc.) according to requirements determined for the different portions.

As dynamic allocations of resources are performed, program execution service 230 may utilize the allocated computing resource(s), such as software containers, virtual compute instances, or servers to execute the portions of the query processing program. In some embodiments, program execution service 230 may procure or otherwise configure computing resource(s) if no preconfigured computing resources from a pool of computing resources satisfy the requirements, in some embodiments. The allocated computing resource(s) may be directed to perform the portions of the query processing program, such as portions to access source data objects 342 to perform quer(ies) 370, apply operations or tasks identified in the queries, and provide query results 380 back to managed query service 240 or other desired location (not illustrated).

Figure 4:
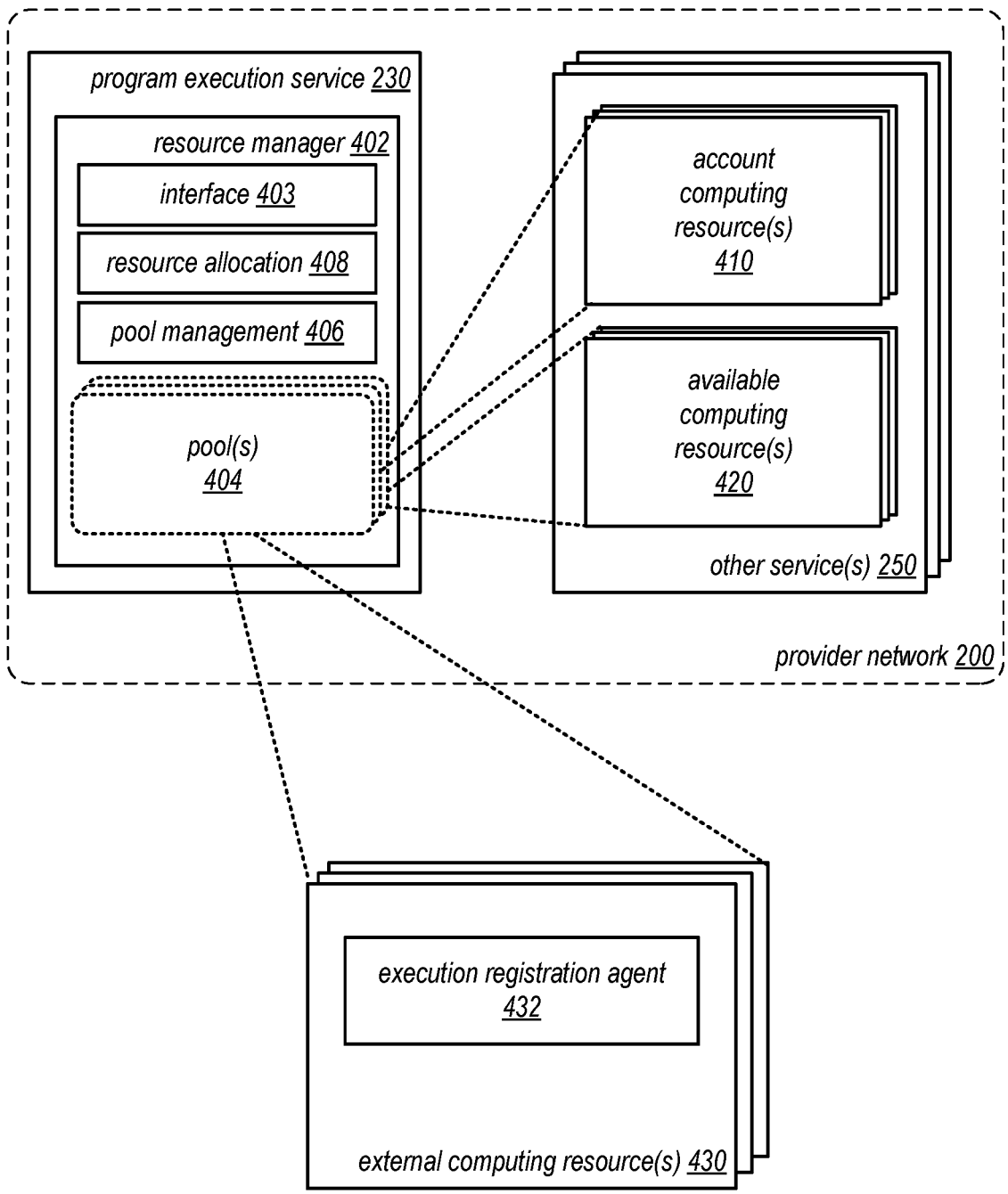
FIG. 4 is a logical block diagram illustrating a resource manager for dynamically allocating resources for interdependent portions of distributed data processing programs from pools of computing resources, according to some embodiments.

FIG. 4 is a logical block diagram illustrating a resource manager for dynamically allocating resources for interdependent portions of distributed data processing programs from pools of computing resources, according to some embodiments. As discussed above in FIG. 1, a resource manager can be implemented to provide allocation of computing resources for portions distributed data processing programs dynamically, utilizing a common resource manager. Resource manager 402 may, for instance, implement an interface 403 which may be invoked to make resource allocations using programmatic calls (e.g., API call to request resources for a portion of a distributed data processing program). Code or other instructions implementing distributed data processing programs may include, reference, or invoke programmatic calls to interface 403. Interface 403 may respond with allocation decisions, indications, or other information in response to the request. In some embodiments, allocated resources may register or may contact with a management resource, for instance, and thus may be the response to an allocation request, in some embodiments. In some embodiments, a denial or other alternative configuration or proposal may be provided via interface 403 in response to an allocation request. Interface 403 may be a common interface capable of interpreting resource allocation requests from various types of distributed data processing applications, such as different engines, platforms, or other program-specific resource management requests. In this way, resource manager 402 may provide a common interface 403 to serve resource allocation requests irrespective of the type of distributed data processing program making the request.

Resource manager 403 may implement resource allocation 408, which may determine what resources to allocate (or deallocate) from a distributed data processing program, in some embodiments. For example, requests for resource allocation may indicate one or more performance characteristics or other requirements. In some embodiments, these requirements may be treated strictly so that the requirements have to be satisfied in order to successfully allocate resources for the requested portion. For example, the requirements may indicate a minimum number of processor cores, type of network configuration or device (e.g., a minimum network bandwidth), memory capacity to be allocated. In some embodiments, different combinations of resources may satisfy the same requirements, and thus resource allocation 408 may select the resources in order to conserve resources in pool(s) 404.

In some embodiments, the requirements indicated in a resource allocation request may represent desired performance characteristics which may be used to guide or influence resource allocation, even if not strictly enforced. For example, a resource allocation request may specify a desired I/O bandwidth for reading data from storage, which resource allocation 408 may use as a performance ceiling, making selections biased to higher I/O bandwidth and if possible providing the desired I/O bandwidth in the allocated resources (but not exceeding allocations for the desired I/O bandwidth). Various selection schemes for allocating resources may include availability information (e.g., obtained from pool management 406) which may balance requirements for a portion of a distributed data processing program with pool management goals (e.g., maintaining a minimum number of different types of resources). For example, an impact score for different possible resource allocations may be determined (e.g., based on the possible effects of the allocation on availability of resources in the pools, such as allocating resources with uncommon characteristics when other resources with more common characteristics can also be used) to select the resources to allocate.

In some embodiments, the allocation request may specify the work to be done by the portion of the distributed data processing program (e.g., a query operation, such as a scan, join, filter, aggregation, a machine learning function or analysis, an image processing operation, including a type of filter, compression, or encoding to apply, etc.), and resource allocation 408 may select based on the specified work. For example, a rules-based allocation model or scheme may map different types of work in the resource allocation requests to resources (e.g., machine learning operations to GPU resources, image processing operations to resources with specially configured hardware (e.g., FPGAs to apply different image filters or encodings), and so on).

Resource manager 402 may utilize pool(s) 404 of computing resources of other service(s) 250 in provider network 200. For example, resource manager 402 may reserve a pool or fleet of computing resources, making the pool or fleet computing resources available 420 for performing portions of distributed data processing programs. In some embodiments, available computing resource(s) 420 may be preconfigured, as discussed above with regard to FIG. 1, to implement operating systems, data processing engines, network configurations, or other capabilities or attributes that may commonly satisfy execution criteria. If, for instance, a distributed data processing program is specified according to code using one of a set number of programming languages, then available computing resources may implement processing engines or other applications that support the set number of programming languages.

Program execution service 230 may handle requests to execute distributed data programs on behalf of clients that are associated with user accounts of provider network 200. As illustrated in FIG. 4, user account computing resource(s) 410 may also be made available for executing portions (or all) of a distributed data processing program on behalf of a client associated with the user account. For example, when a request to execute a distributed data processing program is received, a user account associated with the client may be identified. A listing of resources that are available or in use may be provided to identify account computing resource(s) 410. In at least some embodiments, external computing resource(s) 430 may be used to execute by resource manager 402. For example, external computing resource(s) 430 may be on premise servers, services, or systems, other provider networks or publicly available computing services. External computing resource(s) 430 may implement an execution registration agent 432 which may provide the identity, location, associated accounts and/or capabilities of external computing resource(s) 430 to resource manager 402. Resource manager 402 may consider external computing resource(s) 430 when identifying computing resource(s) that satisfy the execution criteria for executing code.

Figure 5:
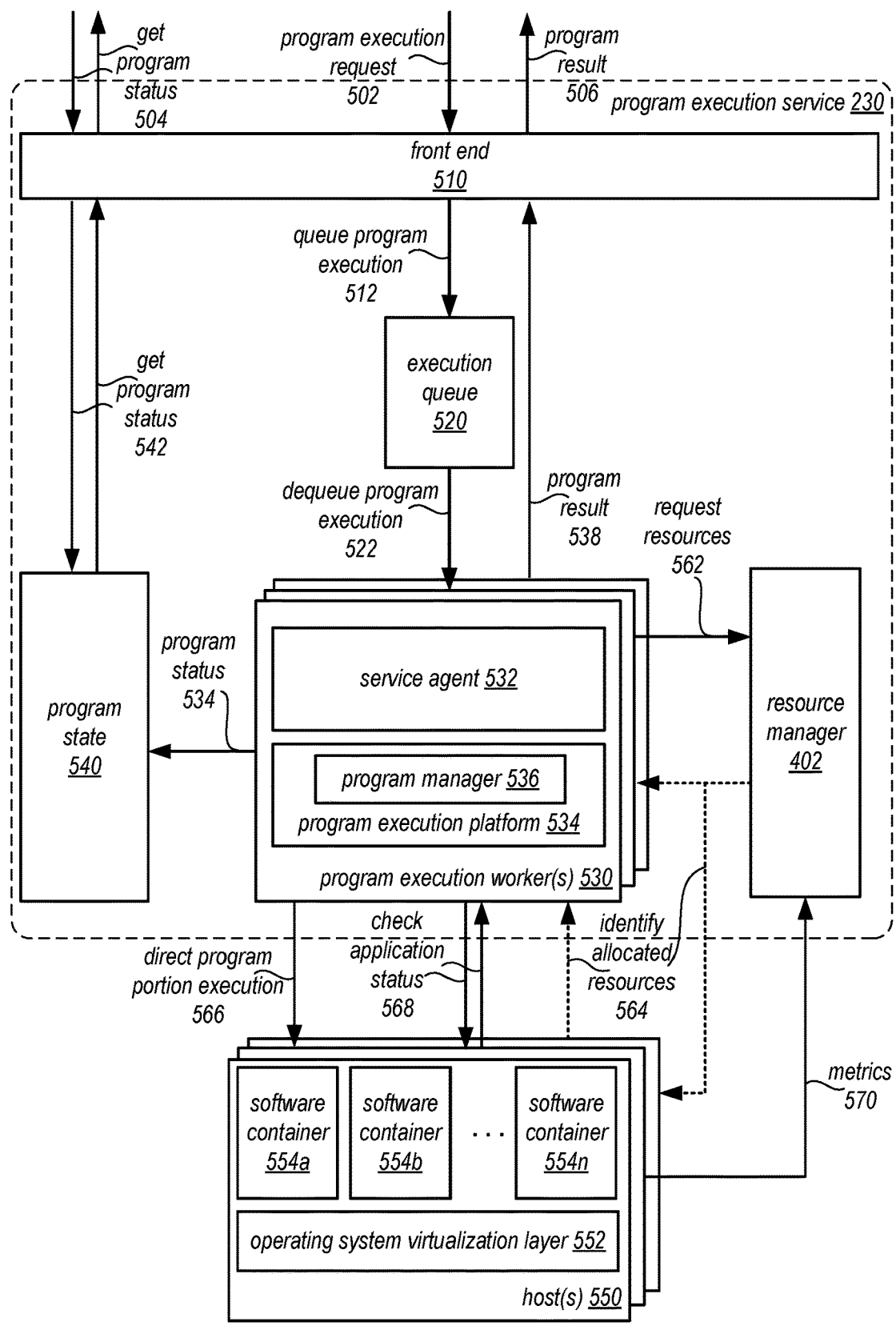
FIG. 5 is a logical block diagram illustrating a program execution service that implements dynamic allocation of resources for interdependent portions of distributed data processing programs, according to some embodiments.

FIG. 5 is a logical block diagram illustrating a program execution service that implements dynamic allocation of resources for interdependent portions of distributed data processing programs, according to some embodiments. Program execution service 230 may implement a programmatic interface (e.g., API) or graphical user interface (GUI) to allow for code execution requests 502 to be submitted to program execution service 230 via a network (e.g., network 260 in FIG. 2). Program execution service 230 may implement front end processing 510, which may handle program execution requests to prepare the execution of program included identified in the program execution requests. For example, front end 510 may implement multiple computing nodes or servers to listen for program execution requests at one or more service endpoints (e.g., network addresses). When a request 502 is received at the service endpoint, a front compute node or server may parse the request, check for request validity, repack, format, or organize data in the request (e.g., program code, performance characteristics, source data, parameters, or other inputs, identity, etc.) and queue 512 or submit execution of the program to execution queue 520.

In at least some embodiments, program execution service 230 may implement a fleet or pool of program execution worker(s) 530 which may initiate or direct performance of a distributed data processing program identified in a request 502. Program execution worker(s) 530 may implement service agent 532 to handle interaction with various program execution service components, such as execution queue 520, resource manager 402, and program state 540. For example, service agent 532 may dequeue a distributed data processing program for execution 522, in some embodiments. Service agent 532 may launch, initialize, configure or initiate execution of the distributed data processing application on program execution platform 534. For example, if a query processing program is dequeued, then the appropriate query processing platform for the program may be launched or initialized as part of program execution platform 534. The distributed data processing program manager 536, master node, coordinator node, driver node, leader node, or other component that may direct the execution of the program may be launched, initialized or stared in the program execution platform, in some embodiments.

In some embodiments, not illustrated, a separate host, resource, or other component of program execution service 230 or another service, such as one of the resources from pool(s) 404 from resource manager 402 may be requested to serve as the host for the manager of the distributed application (e.g., by provisioning a computing resource in a virtual compute service to execute an identified file or image that starts the manager node process on that computing resource). For example, a host implementing a virtual machine or software container may initiate launch program manager 536.

As the program manager 536 performs the distributed data processing program, portions of work to be performed may be identified and resource allocation requests invoked 562 (e.g., using API calls included in the instructions or code for the program manager 536). In this way, users can specify different portions of the application by invoking resource requests to perform different operations, tasks or stages of work. In some embodiments, program manager 536 may determine the portions of the distributed data processing program without explicitly coded instructions (e.g., by generating a query plan to perform a query and identifying different operations of the query plan associated with different portions, which may be allocated resources dynamically). A configuration file or other information for program manger 536 may identify an endpoint or API to invoke for each determined portion in order to obtain a resource allocation, in such scenarios.

In at least some embodiments, service agent 532 may generate and/or send the requests for resource allocations 562 to resource manager 402. As discussed above with regard to FIG. 4, resource manager 402 may dynamic allocations of resources to the task (e.g., based on requirements identified in the request, requirements determined at resource manger 402, or other factors, such as resource availability in resource pools). Requests may be formatted according to interface 403 for resource manager 402, in some embodiments. For example, request resource allocation 562 may include a program identifier for the distributed data processing program being performed, a file path or other location for data to access, parameters, or other inputs to perform the portion of the task, and/or performance requirements or desired resources to determine performance requirements, such as resource type and number (e.g., 4 processors, 5 gigabytes of memory). Once an allocation decision for the portion of the distributed data processing program is made, resource manager may provide a response that identifies allocated resource(s). The response 564 may be provided that indicates an identifier for the allocated portion of the program and resource identifier(s). As depicted in FIG. 5, the allocation response may be sent to those resources that have been allocated to the portion of the program (e.g., software containers 554 on host(s) 550). The response to the resources may include a network address or other location for communicating with the program manager 536. In this way, the allocated resources can check in or register with the program manager proactively. Alternatively, resource manager 402 may provide the identity of allocated resources 564 to the program manager on program execution worker 530 to make contact with the allocated resources.

Once the resources for a portion are allocated, then program manager 536 may route, direct, or otherwise initiate the execution of the portion at the allocated computing resources. For example, as illustrated in FIG. 5, the identified resource(s) may be one or more host(s) 550 (e.g., a computing system, server, node, or devices like computing system 1000 in FIG. 8). Host(s) 550 may implement operating system virtualization layer 552 in order to provide virtualized operating system environments for different software containers 554a, 554b, and 554n. Execution direction 538 may direct code execution, tasks, functions, or other operations at one or more software container(s) 554 which may be initialized or otherwise prepared to perform the portion (e.g., by receiving the program identifier for the distributed data processing program being performed and the file path or other location for data to access, parameters, or other inputs to perform the portion of the program). Software containers 554a may, for instance, implement Spark executors, or other worker tasks for performing distributed data processing.

Program manager 536 may send requests to monitor or check the status 568 of portions of the program being performed at host(s) 550 and/or software containers 554 to perform resource management functions, such as failure recovery (if a host or container fails), automatic resource replacement or dynamic allocation (e.g., increasing or decreasing software containers procured for a portion), heat management (e.g., performing, directing, or implementing load balancing amongst software container(s) 554, or any other program management function. Portion status may include states such as, "CREATED", "RUNNING," "CANCELED," "COMPLETED," and/or "FAILED."

In turn, based on the portion status, program manager 536 may update 534 program state 540 to include similar states, "CREATED", "RUNNING," "CANCELED," "COMPLETED," and/or "FAILED," in some embodiments. Program state 540 may store program status 534 as well as other task errors or events. In some embodiments, program state 540 may be a database or other storage system that may be queryable for particular portions of programs and related data. The program state may provide the execution context of the program at the program manager or allocated resources, such as software containers 554, so that in the event of failure, the execution context or runtime context of the program can be retrieved. Then, execution of the program can continue from the point at which the execution context was stored. In this way, the idempotency of program execution requests can be preserved. In at least some embodiments, a request to get a program status 504 received at front end 510 may be served by getting the program status 542 from program state 540.

In some embodiments, results of the program 538 may be returned from a program execution worker via the front end 510 as a result 506 provided to a client. In at least some embodiments, the result may be dependent upon the distributed data processing program. A query, or other request for data, may return a result that is the requested data (or error response), in some embodiments. A task or job to perform, such as an ETL job, may indicate completion or failure as the result, in some embodiments.

In some embodiments, resource manager 402 may collect metrics 570 from hosts 550 to assess the allocation decisions made at resource manager 402. For example, resource manager 402 may store historical allocation decisions paired with performance metrics of the allocated resources in order to apply machine learning or other statistical analysis to adjust allocation decision models (e.g., to modify mappings, alter selection weights or criteria, or perform other allocation decision adjustments). Resource manger 402 may also learn via the metrics when resources have been released (e.g., by receiving status information) in order to initiate clean up or other operations to return the resources to a pool for performing other work (e.g., for other distributed data processing programs).

Figure 6:
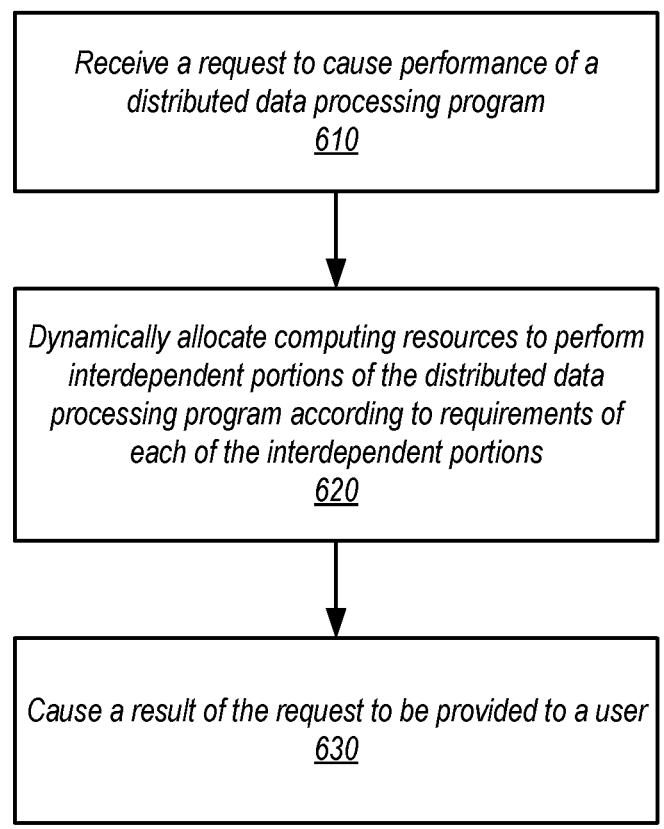
FIG. 6 is a high-level flowchart illustrating methods and techniques to implement dynamically allocating resources for interdependent portions of distributed data processing programs, according to some embodiments.

Although FIGS. 2-5 have been described and illustrated in the context of a program execution service, the various techniques and components illustrated and described in FIGS. 2-5 may be easily applied to other resource management systems for allocating resources to distributed data processing applications. As such, FIGS. 2-5 are not intended to be limiting as to other embodiments of a system that may implement dynamic routing of code for execution. FIG. 6 is a high-level flowchart illustrating methods and techniques to implement dynamically allocating resources for interdependent portions of distributed data processing programs, according to some embodiments. Various different systems and devices may implement the various methods and techniques described below, either singly or working together. For example, a program execution service and/or resource manager such as described above with regard to FIGS. 2-5 may implement the various methods. Alternatively, a combination of different systems and devices, such as a job execution service implemented as part of another system (e.g., an ETL system, am image processing system, etc.) that executes different distributed data processing programs submitted for execution. Therefore, the above examples and or any other systems or devices referenced as performing the illustrated method, are not intended to be limiting as to other different components, modules, systems, or configurations of systems and devices.

As indicated at 610, a request may be received to perform a distributed data processing program, in various embodiments. A request may be received as the result of an event or other trigger condition that automatically generates a request to start performance or execution of a distributed data processing program. For instance, time-based events (e.g., according to scheduled intervals, times, or other measures of time) may trigger the generation of a request to cause performance of a distributed data processing program. In some embodiments, requests may be manually generated or received via graphical or other user interface (e.g., a command line interface) which a user has provided input to cause performance of the distributed data processing program. The request may be received via a programmatic interface, in some embodiments, such as an API call that requests performance of an identified application.

A distributed data processing program may be an engine, platform, or other environment that can be programmed (e.g., via scripts, statements, code files, etc.) to perform tasks or operations to generate, create, evaluate, transform, move, remove, combine, reformat, or otherwise interact with data, often stored in distributed fashion, in some embodiments. The distributed data processing program (e.g., including parameters, configuration information, source files of code or instructions, libraries, executables, and/or other information) may have been previously received and accessed using an identifier indicated in the request, in some embodiments. In some embodiments, the request may include the distributed data processing program (including parameters, configuration information, source files of code or instructions, libraries, executables, and/or other information) in the request.

Performance of the distributed data processing application may be initiated in response to the request, in various embodiments, using various distributed resources. As indicated at 620, the computing resources to perform interdependent portions of the distributed data processing program may be dynamically allocated according to requirements of each of the interdependent portions, in some embodiments. For example, as discussed above with regard to FIGS. 1-5, pools of resources may be tracked or maintained by a resource manager that can respond to allocation requests for individual portions of a distributed data processing program. Interdependent portions may be, in some embodiments, a series of stages, tasks, or operations of a distributed data processing program which may depend upon the results of a previous stage to complete (e.g., extract operations before transform operations before load operations). In some embodiments, interdependent portions may be performed in parallel such the performance of the distributed data processing application as a whole is dependent upon the results of the separate portions (e.g., performing scans of different data stores using different storage engines to read data in different formats). Resource allocations may be performed dynamically, in various embodiments, substantially close to the time the resources are needed to perform the work of the portion of the distributed data processing program.

Requirements may be performance characteristics (e.g., throughput, latency, capacity, or other measures), resource types and numbers (e.g., 4 virtual processors, 10 terabytes of disk storage, etc.), or other parameters for defining the execution of the distributed data processing program. Requirements may be strictly enforced, in some embodiments, such that resource allocations satisfy the requirements or are not made. Requirements may be input parameters, values, considerations, or factors in an allocation or selection model for resources which may guide resource allocations (e.g., balanced with other considerations such as resource pool management thresholds).

Allocated resources may be made available to perform the work of the portion (e.g., by identifying the resources to a resource manager, master node, coordinator node, leader node, or other distributed data processing program component that instructs or directs the performance of the portion at the allocated resources). In some embodiments, allocated resources may register or report to the resource manager. As discussed above, information to perform the work may be provided to the resources, such a file path or other location for data to access, parameters, or other inputs to perform the portion of the program.

As indicated at 630, a result of the request may be caused to be provided to a user, in some embodiments. The result may be, for instance, desired data (e.g., a query result), error response, acknowledgment of completion, or other indication related to the performance of the distributed data processing program. The user may be associated with a client computing device or other application that submitted the request to perform the distributed data processing program or other another device or system registered or otherwise identified for receiving the result, in some embodiments.

Figure 7:
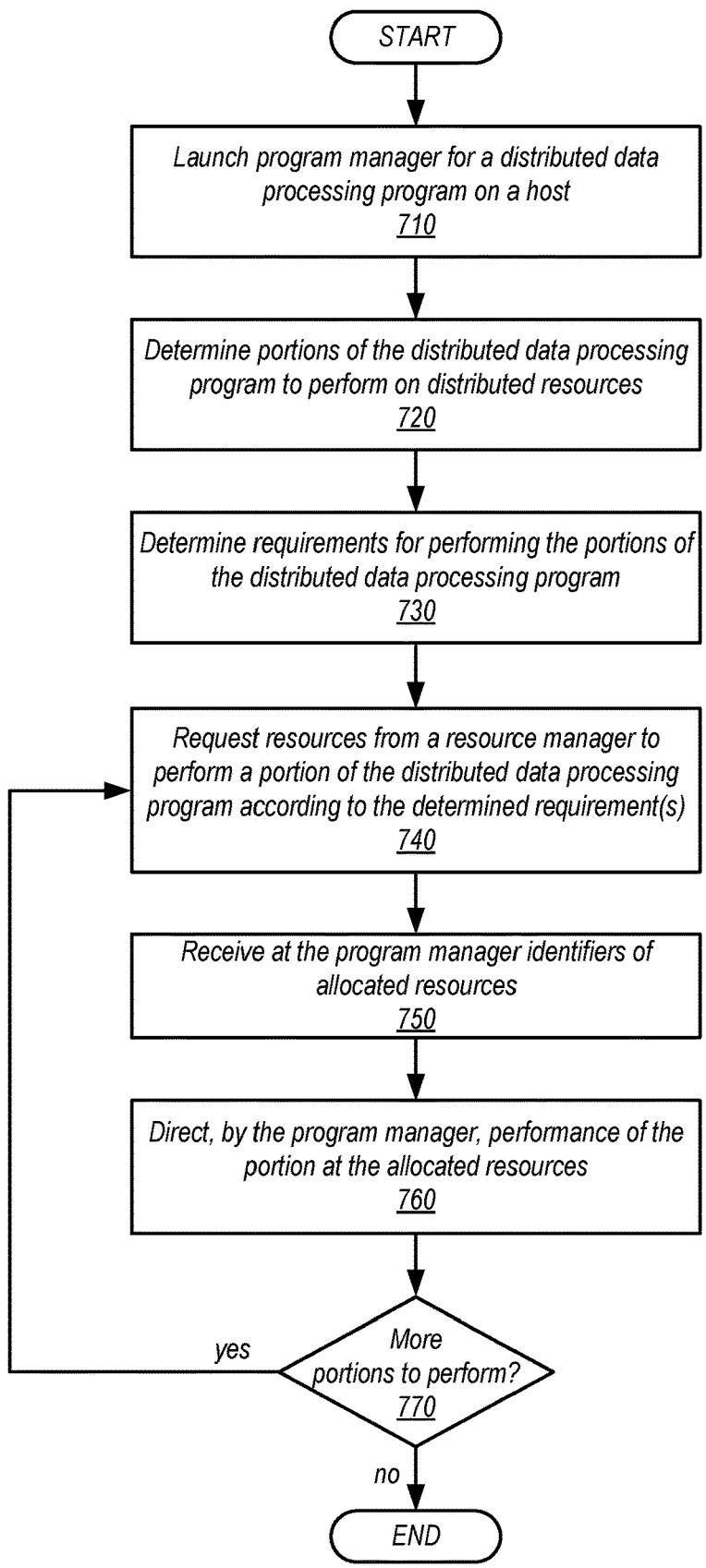
FIG. 7 is a high-level flowchart illustrating methods and techniques to implement obtaining resource allocations from a resource manager to implement dynamically allocating resources for interdependent portions of distributed data processing programs, according to some embodiments.

FIG. 7 is a high-level flowchart illustrating methods and techniques to implement obtaining resource allocations from a resource manager to implement dynamically allocating resources for interdependent portions of distributed data processing programs, according to some embodiments. As indicated at 710, a program manager may be launched for a distributed data processing program on a host, in various embodiments. For example, a resource manager, such as resource manager 402 in FIG. 4, may provide an available host, server, or other system that can launch or execute the program manager for the distributed data processing program. In some embodiments, a service host, such as a program execution worker 530 may serve as the host for the program manager.

As indicated at 720, portions of the distributed data processing program to perform on distributed resources may be determined. For example, a query plan may be generated and divided into groups of like operations or stages (e.g., scan and filter operations, join operations, aggregation operations, etc.) to determine the portions according to the query plan. In some embodiments, different types of actions, such as extract actions, transform actions, and load actions for ETL jobs or read operations to obtain data and analysis operations to apply a machine learning transformation to the data (e.g., generate vectors or other profiles or representations based on the obtained data, may indicate different portions. As indicated at 730, requirements for performing the portions of the distributed data processing program may be determined, in some embodiments. For example, the distributed data processing program may include designer specified requirements (e.g., in the program instructions, scripts, or statements provided as input or parameters to the distributed data processing program). If, for instance, instructions for the program include API calls to invoke resource allocation requests for different portions, then the information identified in the parameters of the API call may indicate or otherwise determine the requirements for performing a portion of the distributed data processing program. In some embodiments, cost thresholds, performance characteristics, or other information may be provided in a request to perform the distributed data processing application, which may be used to determine the allocation of resources, in some embodiments.

As indicated at 740, resources for a portion of the distributed data processing program may be requested from a resource manager according to the determined requirement(s). For example, the API call or request format may include fields or parameters for describing the requirements for performing the portion of the distributed data processing application, in some embodiments. As indicated at 750, identifiers of allocated resources may be provided to the program manager, in some embodiments. For example, the resources may register, check in or otherwise notify the program manager of readiness to perform work using a location (e.g., network address) or other identifier for the program manager provided to the allocated resources. Performance of the portion at the allocated resources may be directed by the program manager, as indicated at 770, in some embodiments. Requests, for example, may be sent to describe, instruction, or otherwise cause performance of tasks, operations, or other work for the portion of the distributed data processing program to the allocated resources, in one embodiment. Allocation requests may be performed for each portion of the distributed data processing program, as indicated by the positive exit from 770, in various embodiments, so that resource allocation is dynamically performed. In some embodiments, portions of the distributed data processing program may be performed at or near parallel, and thus requests for resource allocation may be performed at or near parallel.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
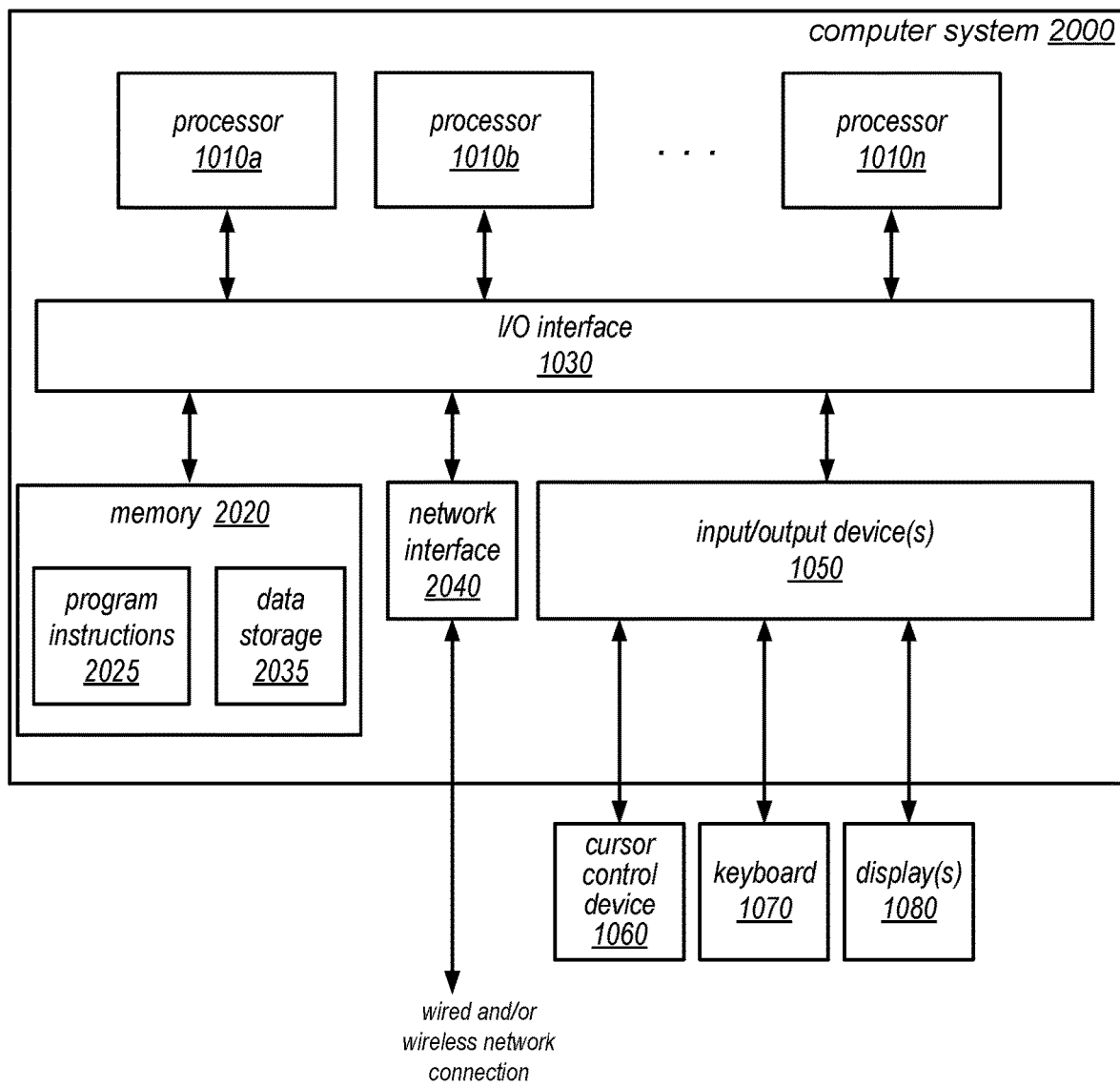
FIG. 8 illustrates an example system to implement the various methods, techniques, and systems described herein, according to some embodiments.

Embodiments of dynamically allocating resources for interdependent portions of distributed data processing programs as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing node, compute device, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, which implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a program execution system may present program execution services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a memory to store program instructions which, if performed by at least one processor, cause the at least one processor to perform a method to at least:
   receive a request to cause performance of a distributed data processing program;
   in response to the receipt of the request, launch a program manager of the distributed data processing program at a host;
   during the performance of the distributed data processing program:
   determine two or more interdependent portions of the distributed data processing program to be performed;
   receive a first request to allocate a first computing resource to perform a first of the two or more interdependent portions at a resource manager;

allocate, by the resource manager, the first computing resource from one or more pools of computing resources according one or more requirements of the first of the two or more interdependent portions responsive to the first request;

subsequent to initiation of performance of the first of the two or more independent portions, receive a second request to allocate a second computing resource to perform a second of the two or more independent portions of the distributed data processing program at the resource manager; and allocate, by the resource manager, the second computing resource from the one or more pools of computing resources according one or more requirements of the second of the two or more interdependent portions of the distributed data processing program responsive to the second request; and cause a result of the request to cause the performance of the distributed data processing program to be provided to a user.

2. The system of claim 1, wherein the requests to allocate respective resources indicate the one or more requirements for the two or more interdependent portions.

3. The system of claim 1, wherein the program instructions cause the at least one processor to perform the method to further:

direct, by the resource manager, one or more cleanup operations at the allocated resources for one of the interdependent portions after performance the one interdependent portion at the allocated computing resources; and return, by the resource manager, the allocated resources of the one interdependent portion to the one or more pools.

4. The system of claim 1, wherein the at least one processor and the memory are implemented as part of a program execution service of a provider network and wherein the request to cause the performance of the distributed data processing program is received from another service of the provider network.

5. A method, comprising:

receiving a request to cause performance of a distributed data processing program;

during the performance of the distributed data processing program:

determine two or more interdependent portions of the distributed data processing program to be performed; and dynamically allocating a first computing resource to perform a first of the two or more interdependent portions of the distributed data processing program according to one or more requirements of the first of the two or more interdependent portions, the one or more requirements the first of the two or more interdependent portions indicated in a first allocation request for the first of the two or more interdependent portions;

subsequent to initiation of performance of the first of the two or more independent portions, allocating a second computing resource to perform a second of the two or more interdependent portions of the distributed data processing program according to one or more requirements of the second of the two or more interdependent portions, the one or more requirements the second of the two or more interdependent portions indicated in a second allocation request for the second of the two or more interdependent portions; and causing a result of the request to be provided to a user.

6. The method of claim 5, further comprising launching a program manager at a host to direct performance of the interdependent portions of the distributed data processing program at the allocated computing resources.

7. The method of claim 6, wherein dynamically allocating the computing resources to perform the two or more interdependent portions of the distributed data processing program according to the one or more requirements of each of the two or more interdependent portions comprises:

receiving the respective allocation requests for the two or more interdependent portions at a resource manager from the program manager for the distributed data processing program; and evaluating, by the resource manager the respective allocation requests according to the indicated requirements to select the resources to allocate to the two or more interdependent portions of the distributed data processing program.

8. The method of claim 7, wherein dynamically allocating the computing resources to perform the two or more interdependent portions of the distributed data processing program according to the one or more requirements of each of the two or more interdependent portions comprises causing the allocated resources for the two or more interdependent portions to register the with the program manager to perform the two or more interdependent portions.

9. The method of claim 6, wherein the computing resources are allocated from one or more pools of preconfigured computing resources and wherein the method further comprises returning, by the resource manager the allocated resources of one of the interdependent portions to the one or more pools for allocation to another distributed data processing program after the cleanup operations after performance of the one interdependent portion at the allocated computing resources.

10. The method of claim 6, wherein dynamically allocating the computing resources to perform the two or more interdependent portions of the distributed data processing program is performed by a resource manager and wherein the method further comprises determining, by the resource manager the one or more requirements for performing each of the two or more interdependent portions of the distributed data processing program.

11. The method of claim 5, wherein at least one of the computing resources allocated to a first one of the two or more interdependent portions of the distributed data processing program is different than the computing resources allocated to a second one of the two or more interdependent portions of the distributed data processing program.

12. The method of claim 5, wherein the distributed data processing program is a query processing program form performing a query to a distributed data set, wherein the request to cause the performance of the distributed data processing program is received from a managed query service at a program execution service, wherein the managed query service and the program execution service are implemented as part of a provider network.

13. The method of claim 5, wherein the computing resources are allocated from one or more pools of preconfigured computing resources hosted in one or more network-based service of a provider network, wherein the receiving, the dynamically allocating, and the causing are performed by a program execution service implemented as part of the provider network.

14. A non-transitory, computer-readable storage medium, storing program instructions that when executed by one or more computing devices cause the one or more computing devices to implement:
  receiving a request to cause performance of a distributed data processing program;
  during the performance of the distributed data processing program:
    determine two or more interdependent portions of the distributed data processing program to be performed;
    determining one or more requirements for performing a first of the two or more interdependent portions of the distributed data processing program, the one or more requirements indicated in a first allocation request for the first of the two or more interdependent portions;
    dynamically allocating a first computing resource to perform the first of the two or more interdependent portions of the distributed data processing program according to the determined one or more requirements of the first of the two or more interdependent portions;
    subsequent to initiation of performance of the first of the two or more independent portions, determining one or more requirements for performing a second of the two or more interdependent portions of the distributed data processing program, the one or more requirements indicated in a second allocation request for the second of the two or more interdependent portions; and
    dynamically allocating a second computing resource to perform the second of the two or more interdependent portions of the distributed data processing program according to the determined one or more requirements of the second of the two or more interdependent portions; and
  causing a result of the request to be provided to a user.

15. The non-transitory, computer-readable storage medium of claim 14, wherein the program instructions cause the one or more computing devices to further implement launching a program manager at a host to direct performance of the interdependent portions of the distributed data processing program at the allocated computing resources.

16. The non-transitory, computer-readable storage medium of claim 15,
  wherein the program instructions cause the one or more computing devices to further implement receiving the respective allocation requests for the two or more interdependent portions at a resource manager from the program manager for the distributed data processing program;
  wherein, in determining the one or more requirements for performing each of two or more interdependent portions of the distributed data processing program, the program instructions cause the one or more computing devices to implement identifying the requirements for the interdependent portions of the distributed data processing program indicated in the requests; and
  wherein, in dynamically allocating computing resources to perform the two or more interdependent portions of the distributed data processing program according to the determined requirements of each of the two or more interdependent portions, the program instructions cause the one or more computing devices to implement evaluating, by the resource manager the respective allocation requests according to the indicated requirements to select the resources to allocate to the two or more interdependent portions of the distributed data processing program.

17. The non-transitory, computer-readable storage medium of claim 15, wherein the program instructions further cause the one or more computing devices to implement directing, by the resource manager, one or more cleanup operations at the allocated resources for one of the interdependent portions after performance the one interdependent portion at the allocated computing resources.

18. The non-transitory, computer-readable storage medium of claim 17, wherein the computing resources are allocated from one or more pools of preconfigured computing resources and wherein the program instructions further cause the one or more computing devices to implement returning, by the resource manager the allocated resources of the one interdependent portion to the one or more pools for allocation to another distributed data processing program after the cleanup operations.

19. The non-transitory, computer-readable storage medium of claim 14, wherein at least one of the computing resources allocated to a first one of the two or more interdependent portions of the distributed data processing program is also allocated to a second one of the two or more interdependent portions of the distributed data processing program.

20. The non-transitory, computer-readable storage medium of claim 14, wherein the distributed data processing program is an Extract Transform Load (ETL) job, wherein the request to cause the performance of the distributed data processing program is received from an ETL service at a program execution service, wherein the ETL service and the program execution service are implemented as part of a provider network.

* * * * *